(12) United States Patent
Balogh et al.

(10) Patent No.: US 6,246,592 B1
(45) Date of Patent: Jun. 12, 2001

(54) UNIQUE POWER SUPPLY ARCHITECTURE WITH CASCADED CONVERTERS FOR LARGE INPUT-TO-OUTPUT STEP-DOWN RATIO

(75) Inventors: Laszlo Balogh, Merrimack; Christopher D. Bridge; William M. Andreycak, both of Bedford, all of NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/598,555

(22) Filed: Jun. 21, 2000

Related U.S. Application Data

(60) Provisional application No. 60/148,164, filed on Aug. 10, 1999.

(51) Int. Cl.[7] .................................................. H02M 3/335
(52) U.S. Cl. .................................................. 363/16; 363/97
(58) Field of Search ................................. 363/15, 16, 20, 363/21, 95, 97, 131

(56) References Cited

U.S. PATENT DOCUMENTS

| | | | |
|---|---|---|---|
| 3,571,692 | 3/1971 | Andren | 321/18 |
| 3,660,749 | 5/1972 | Kadri | 321/2 |
| 3,947,747 | 3/1976 | Smith | 321/2 |
| 4,020,408 | 4/1977 | Grant | 321/2 |
| 4,449,173 | 5/1984 | Nishino et al. | 363/21 |
| 4,491,768 | 1/1985 | Slicker | 318/139 |
| 5,198,969 | 3/1993 | Redi et al. | 363/17 |
| 5,295,058 | 3/1994 | McGreevy | 363/26 |
| 5,442,534 | 8/1995 | Cuk et al. | 363/16 |
| 5,528,480 * | 6/1996 | Kikinis et al. | 363/15 |
| 5,535,112 | 7/1996 | Vazquez Lopez et al. | 363/20 |
| 5,541,828 | 7/1996 | Rozman | 363/21 |
| 5,552,695 * | 9/1996 | Schwartz | 323/271 |
| 5,565,761 | 10/1996 | Hwang | 323/222 |
| 5,570,276 | 10/1996 | Cuk et al. | 363/16 |
| 5,805,432 | 9/1998 | Zaitsu | 363/16 |
| 5,808,879 | 9/1998 | Liu et al. | 363/17 |
| 5,815,380 | 9/1998 | Cuk et al. | 363/16 |
| 5,815,381 | 9/1998 | Newlin | 363/17 |
| 5,828,558 | 10/1998 | Korcharz et al. | 363/20 |
| 5,999,417 | 12/1999 | Schlecht | 363/16 |

* cited by examiner

Primary Examiner—Matthew Nguyen
(74) Attorney, Agent, or Firm—Weingarten, Schurgin, Gagnebin & Hayes LLP

(57) ABSTRACT

A power supply having a transformer-coupled power converter cascaded with a buck power converter. The transformer-coupled power converter operates in a free-running mode at a nearly 100% maximum duty cycle to convert an input voltage to an intermediate voltage. The buck power converter produces a regulated output voltage from the intermediate voltage. The power supply further includes a pulse width modulation (PWM) controller employing leading-edge modulation of complementary control signals used to control buck switches in the buck converter. The PWM controller is synchronized to primary-side free-running switches of the transformer-coupled power converter by a synchronization signal that is fed-forward across an isolation boundary via a signal transformer. The power supply also may also employ a soft-switching technique to reduce switching losses.

11 Claims, 7 Drawing Sheets

UNIQUE POWER SUPPLY ARCHITECTURE WITH CASCADED CONVERTERS FOR LARGE INPUT-TO-OUTPUT STEP-DOWN RATIO

CROSS REFERENCE TO RELATED APPLICATIONS

This application claims priority under 35 U.S.C. §119(e) of U.S. Provisional Application No. 60/148,164, filed Aug. 10, 1999.

STATEMENT REGARDING FEDERALLY SPONSORED RESEARCH OR DEVELOPMENT

Not Applicable

BACKGROUND OF THE INVENTION

The invention relates generally to power supplies, and more particularly to cascaded power converters.

Cascaded power converter arrangements including two or more power converters are well known. The cascaded arrangement of conventional converter topologies is dependent upon the requirements of a particular application. Cascaded converters are most commonly used to provide large input to output voltage conversion ratios (step-up or step-down) or for providing multiple functions that are not feasibly implemented in a single converter.

In one conventional cascaded arrangement, a first buck converter is followed by a second buck converter. A buck converter is characterized by its voltage step-down ratio wherein the output voltage is lower than the input voltage to thereby produce a higher average output current. The cascaded buck converters produce an even larger voltage step-down ratio and a correspondingly greater average output current.

Another known arrangement utilizes cascaded boost PFC converters. A boost converter is characterized by its voltage step-up ratio wherein the output voltage is higher than the input voltage but produces a lower average output current. The cascaded boost converters produce an even larger voltage step-up ratio and a correspondingly smaller average output current.

In yet another known arrangement, a non-isolated boost converter is followed by one of several possible post regulator circuits, such as a buck or isolated buck derived converter, to provide for independently regulated auxiliary output voltages in single or multiple output converters.

With the proliferation of new semiconductor device families, the number of different supply voltages needed to power data communication and telecommunication systems has increased significantly. These supply voltages must also be generated at ever increasing current ratings, stringent output voltage tolerances, and fast transient responses. Conventional cascaded converters can be inadequate for systems with these requirements. Therefore, a new approach in power conversion and distribution is needed.

BRIEF SUMMARY OF THE INVENTION

A power supply for high-current, low-voltage applications comprises a transformer-coupled input power converter cascaded with a buck output power converter. The transformer-coupled input power converter steps down an input voltage to an unregulated intermediate voltage that is inversely proportional to the turns ratio, N:1, of a transformer. The transformer-coupled input power converter is preferably capable of producing a nearly 100% maximum duty cycle output waveform to eliminate the need for an output filter on the secondary side of the transformer, and it is preferably operated in a free-running mode to avoid the need to feed back a switching pulse width control signal and to eliminate the need for a start-up circuit. Furthermore, the nearly 100% maximum duty cycle is preferably adjusted so that a pair of primary-side power switches operate with zero voltage transition to essentially eliminate primary-side switching losses. A minimum freewheeling time interval can allow for the use of self-driven, synchronous rectifiers on the secondary side that do not require the complicated timing circuits usually associated with synchronous rectifiers. The cascaded buck output power converter, which may employ either a conventional diode rectifier or synchronous rectifiers, converts the unregulated intermediate voltage into a regulated output voltage.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description of the Invention in conjunction with the drawings, of which.

DETAILED DESCRIPTION OF THE INVENTION

The disclosure of U.S. Provisional Application No. 60/148,164, filed Aug. 10, 1999, is hereby incorporated by reference.

Figure 1A:
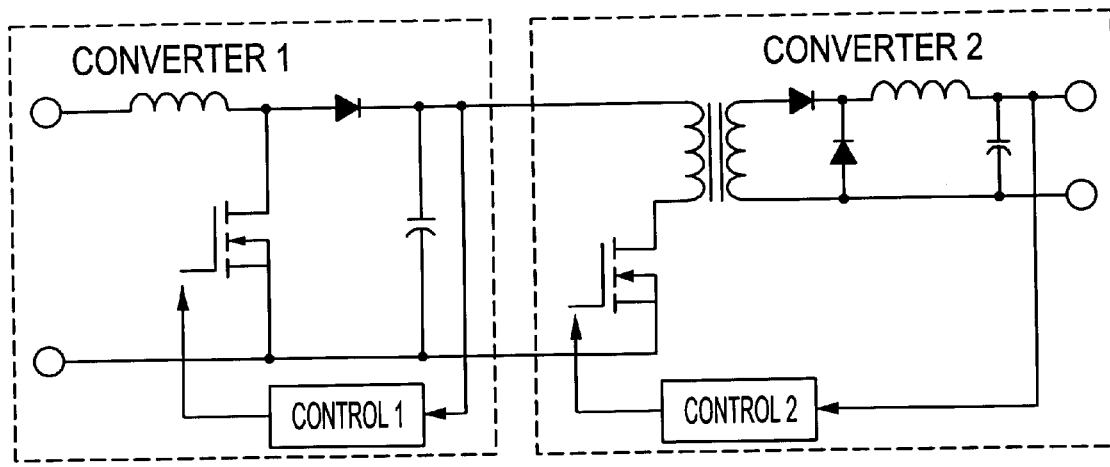
FIGS. 1A–1D are block diagrams of conventional power supplies having cascaded architectures as known in the prior art.
Figure 1B:
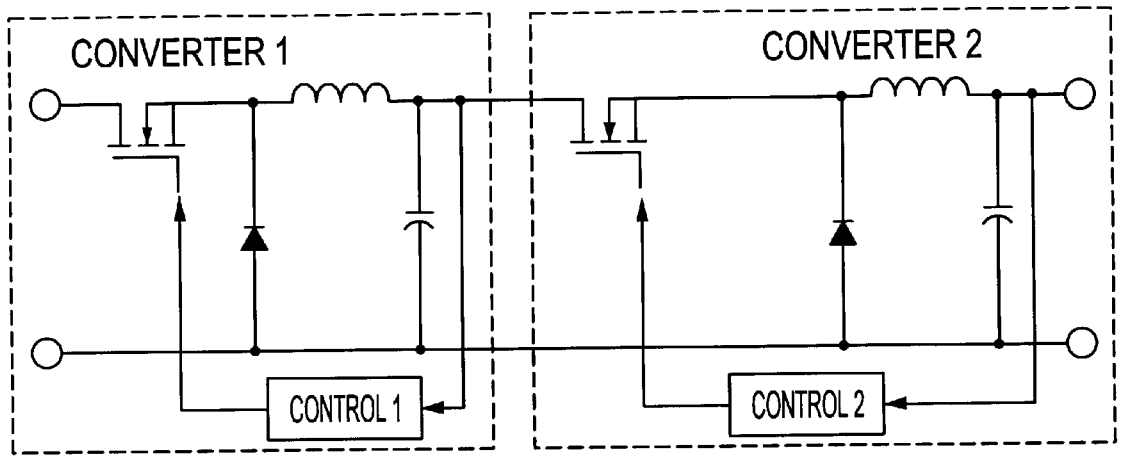
Figure 1C:
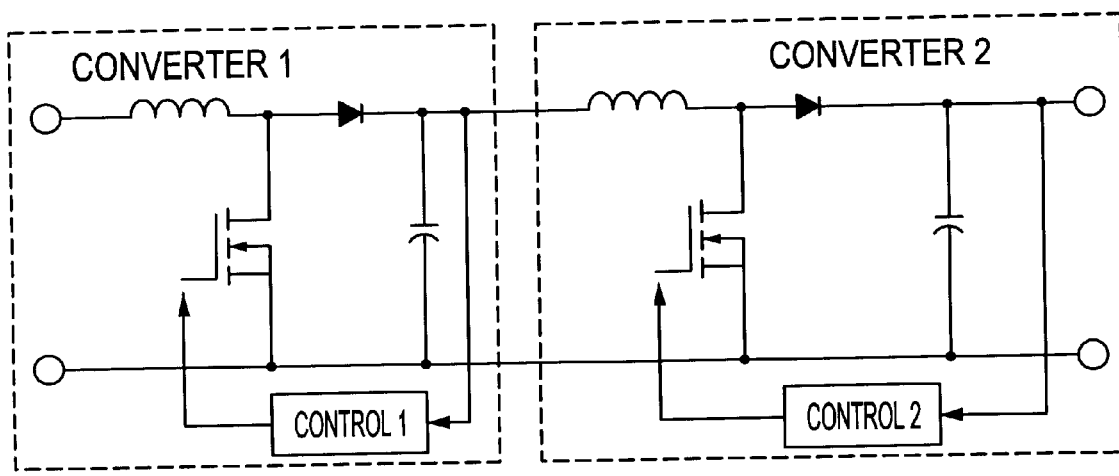
Figure 1D:
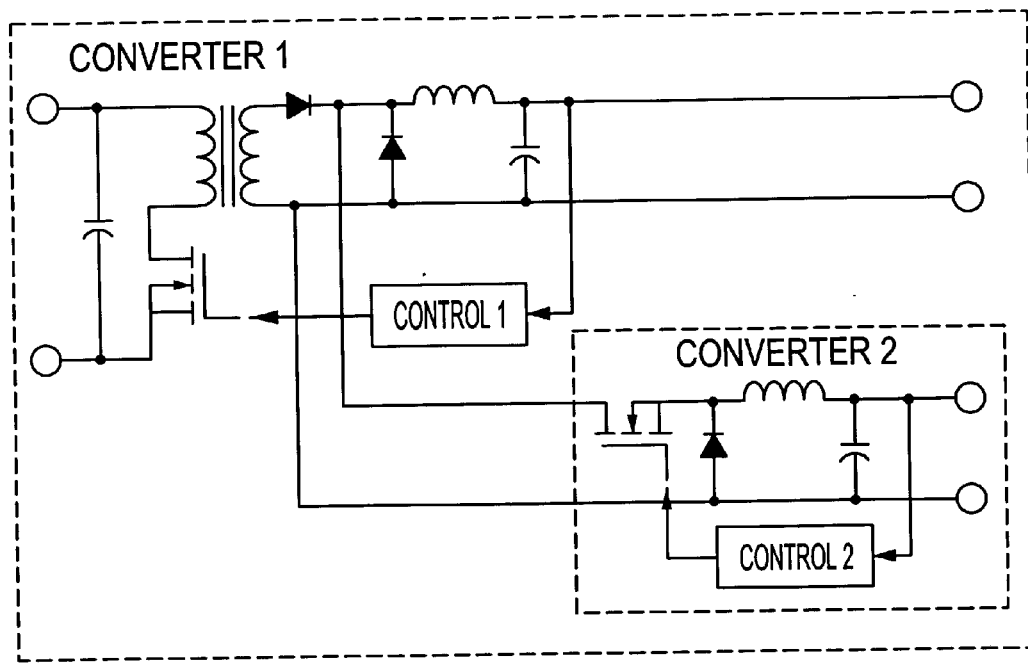

FIGS. 1A–1D show typical examples of known cascaded power converter arrangements. More particularly, FIG. 1A shows an arrangement having a power factor correcting (PFC) boost converter followed by an isolated DC/DC converter. FIG. 1B shows two cascaded non-isolated buck converters, which can be used to provide a large step-down ratio. FIG. 1C shows cascaded boost converters for obtaining a large step-up ratio, and FIG. 1D shows an isolated DC/DC converter followed by a post regulator circuit for obtaining an independently regulated auxiliary output voltage.

Figure 2:
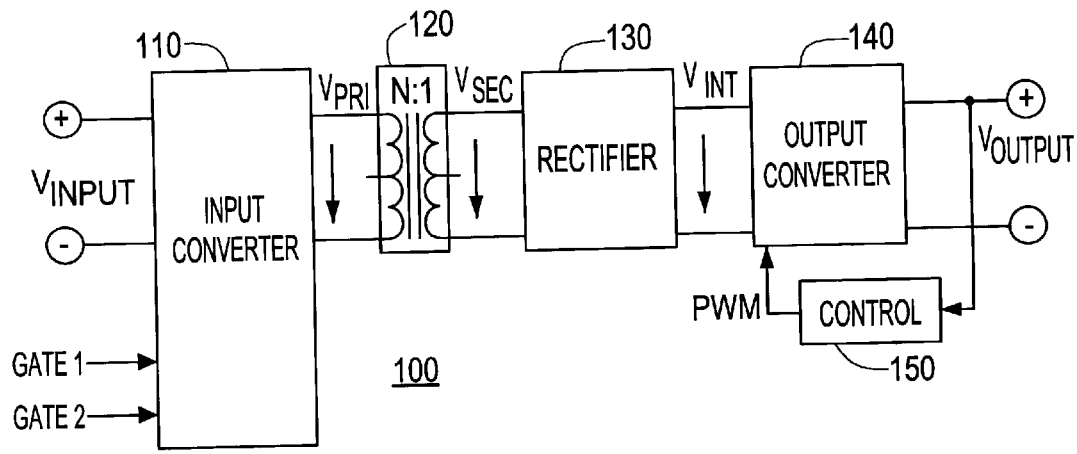
FIG. 2 is a block diagram of an isolated power supply having a cascaded architecture in accordance with the invention.

FIG. 2 shows an isolated power supply 100 that steps down an input voltage $V_{IN}$ to a regulated output voltage $V_{OUT}$. The power supply 100 includes an input power converter 110, a power transformer 120, a rectifier circuit 130, an output power converter 140, and a pulse width modulation (PWM) controller 150. The input power converter 110 may be any power converter capable of producing a nearly 100% duty cycle primary-side voltage $V_{PRI}$, such as a push-pull, half-bridge or full-bridge circuit. The primary-side voltage $V_{PRI}$ appears across primary-side windings 122, 124 of the power transformer 120. The power transformer 120 provides isolation between the power source and the load, and steps down the primary-side voltage $V_{PRI}$ to a secondary-side voltage $V_{SEC}$ that appears across secondary-side windings 126, 128 of the power transformer 120 and is inversely proportional to the transformer turns ratio N:1. The rectifier circuit 130 rectifies the secondary-side voltage $V_{SEC}$ to produce an intermediate voltage $V_{INT}$. The output power converter 140 is a buck switching-mode converter that operates in response to a PWM control signal generated by the PWM controller 150 to produce the regulated output voltage $V_{OUT}$.

Figure 3:
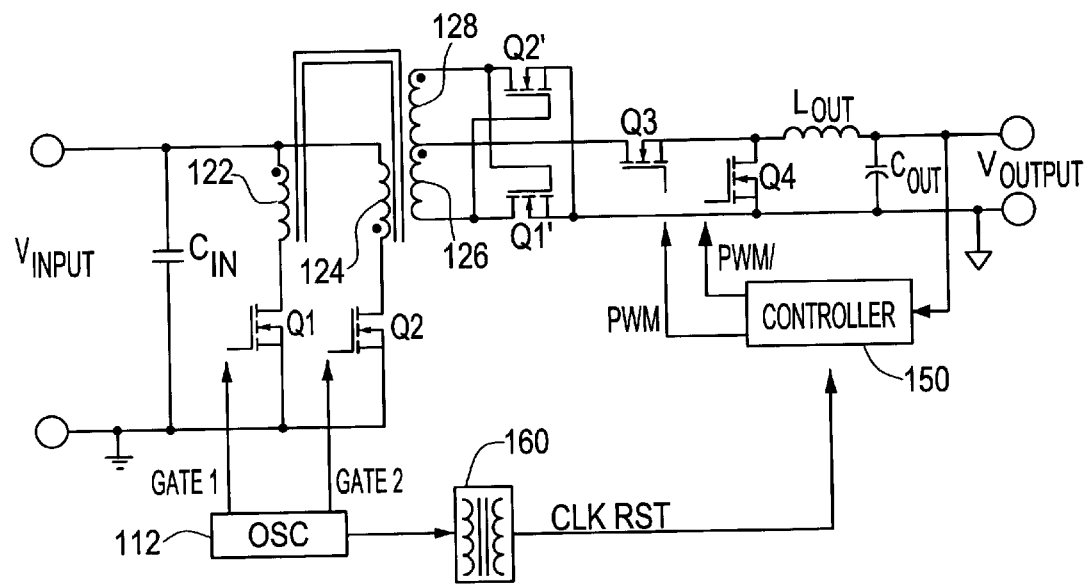
FIG. 3 is a schematic diagram of the isolated power supply of FIG. 2.

Referring to FIG. 3, the input power converter 110 is a push-pull power converter and the output power converter 140 is a buck power converter. High-frequency noise on the input voltage is shunted to ground by input capacitor $C_{IN}$. A free-running oscillator 112 generates control signals GATE1 and GATE2 used to control first and second primary-side metal oxide semiconductor field effect transistor (MOSFET) push-pull power switches Q1 and Q2 respectively. As shown in the timing diagram of FIG. 5, the pulses of the GATE1 and GATE2 control signals have widths and phases such that the primary side voltage $V_{PRI}$ has a nearly 100% duty cycle.

The waveform of the secondary side voltage $V_{SEC}$ is identical to the primary-side voltage $V_{PRI}$, except that its magnitude is stepped down in accordance with the turns ratio N:1 of the power transformer 120. The secondary-side voltage $V_{SEC}$ is rectified by self-driven synchronous secondary-side MOSFET (top and bottom) rectifier switches Q1' and Q2' to produce the unregulated intermediate voltage $V_{INT}$. As described in more detail below, the rectifier switches Q1' and Q2' conduct only when their respective push-pull switches Q1 and Q2 are activated.

A forward buck MOSFET power switch Q3 and a free-wheeling buck MOSFET power switch Q4 are driven by complementary control signals PWM and PWM/ respectively. These signals are generated by a PWM controller 150, which modulates the position of the rising (or leading) edge of the PWM control signals based on the level of the output voltage $V_{OUT}$. The operation of the PWM controller 150 is synchronized to the free-running oscillator 112 by a clock reset signal CLK RST, which is fed forward across the isolation boundary through a signal transformer 160. Those skilled in the art will recognize that alternative means for feeding the CLKRST signal across the isolation boundary, such as an opto-coupler, may be employed.

Regarding the switches Q3 and Q4, in alternative embodiments bipolar transistors may be used as switching elements, rather than MOSFET devices as shown. Additionally, a diode may be used in place of the transistor Q4 as the freewheeling rectifier element.

Traditional push-pull power converters employ an L-C low-pass output filter to reduce switching noise on the output. In the illustrated push-pull power converter, it is feasible to dispense with such a filter for the following reasons: the operation of the input and output power converters is synchronized via the clock reset signal CLK RST; the maximum duty cycle of the forward buck switch Q3 is limited to slightly below 100%; and the guaranteed minimum off time of the forward buck switch Q3 coincides to the off time of the push-pull switches Q1 and Q2. When these conditions are met, the buck converter does not recognize the intermediate voltage $V_{INT}$ as an AC waveform, because a positive voltage is present at the converter input whenever the forward buck switch Q3 is switched to the ON state.

It is well known that semiconductor switches suffer power losses as the switching frequency increases. These losses can be reduced by increasing the turn-on and turn-off switching speeds to thereby shorten the overlap time when both high current and high voltage are present in the switch. Turn-off switching speed can be increased simply by employing a fast, low-impedance gate drive circuit. Turn-on switching speed, on the other hand, is more difficult to increase, because the switch has to work against the recovery characteristics of a rectifier diode or a parasitic "body diode" of the semiconductor device.

A "soft-switching" technique, referred to as "zero voltage transition" (ZVT) or "zero voltage switching" (ZVS), is typically employed to reduce the drain-to-source voltage prior to switch turn-on, and thus overcome the recovery characteristics of the rectifier or body diode. Although the efficiency gain is typically no greater than a couple of percentage points, the main benefit is decreased operating temperature and, consequently, improved reliability of the circuit. For instance, the use of soft switching may improve efficiency only from 90% to 92%. However, this small efficiency increase represents a 20% decrease in power dissipation in the converter, and an attendant improvement in long-term reliability.

Figure 4:
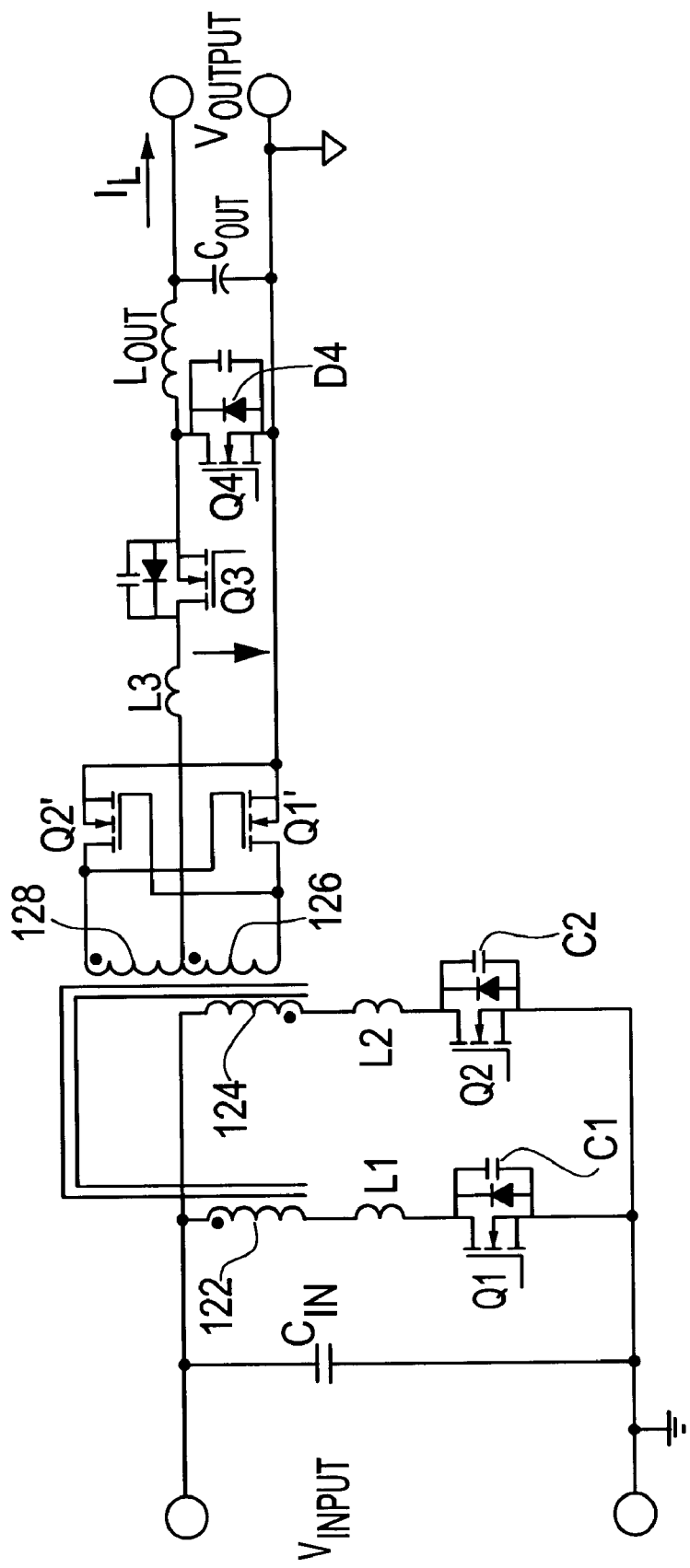
FIG. 4 is a more detailed schematic diagram of a portion of the isolated power supply of FIG. 3, showing several parasitic elements that provide for soft switching operation.

Soft switching of the push-pull switches Q1 and Q2 is achieved using the energy stored in leakage inductance between the primary-side windings 122, 124 of the transformer 120. This leakage inductance is represent by the first and second leakage inductors L1 and L2 of FIG. 4. At the beginning of a period of the clock reset signal CLK RST, just before all switches are simultaneously switched to the OFF state, a load current $I_L$ and a transformer magnetizing current are flowing through one of the primary-side windings and its associated push-pull switch, e.g. the first primary-side winding 122 and the first push-pull switch Q1. The same current flows through the corresponding leakage inductance, i.e., the first leakage inductor L1. Inductive energy stored in the leakage inductance is delivered in a lossless energy transfer to the drain-to-source capacitance of the corresponding push-pull switch after the first push-pull switch Q1 is switched to the OFF state. The drain-to-source capacitance of the first push-pull switch Q1 and the drain-to-source capacitance of the second push-pull switch Q2 are represented by the first and second capacitors C1 and C2, respectively, of FIG. 4.

A resonant action between the leakage inductance and the drain-to-source capacitance takes place during the clock reset period. Preferably, the clock reset period is set to approximately one-fourth of the resonant period. The second push-pull switch Q2, which is switched to the ON state during the next clock cycle, has zero volts across its drain and source terminals at the end of the clock reset period to achieve the lossless turn-on of the switch. In the case where the discharge of a timing capacitor used to establish the clock reset period (not shown) cannot be accomplished within one-fourth of the resonant period, an additional capacitor (not shown) can be added between the two drain terminals of the push-pull switches Q1 and Q2 to thereby adjust the resonant period.

On the secondary side, the self-driven, synchronous rectifier switches Q1' and Q2' switch to the ON state in a lossless manner because there is no current flowing in the secondary-side windings 126, 128 at their respective turn-on instants. This is ensured by the forward buck switch Q3, which is in the OFF state when the rectifier switches Q1' and Q2' switch to the ON state. Furthermore, both rectifier switches Q1' and Q2' operate in a reverse conduction mode which ensures a lossless turn-on. During reverse conduction, current flows from the source terminal to the drain terminal of the device.

The turn-on of the forward buck switch Q3 follows very shortly after the turn-off of the freewheeling buck switch Q4. Before the forward buck switch Q3 is switched to the ON state, the load current is flowing in the body diode D4 of the freewheeling buck switch Q4, through the output inductor $L_{OUT}$, and the load (not shown). During the transition, when the freewheeling buck switch Q4 is switched to the OFF state and the forward buck switch Q3 is switched to the ON state, the load current must establish a new path through a secondary-side winding (126 or 128) of the transformer 120, through the corresponding rectifier switch (Q1' or Q2') and the forward buck switch Q3. The current must decrease and change direction in the freewheeling buck switch Q4 to remove the stored charge from the body diode D4. The current through the forward buck switch Q3 increases by the same rate that the current through the body diode D4 is decreasing, because the sum of these two currents has to equal the inductor current which is essentially constant during the switching time. For example, assuming a sufficient gate drive, the current increase in a new path through the bottom secondary-side winding 126, the bottom rectifier switch Q1', and the forward buck switch Q3, is not limited by the switching speed of the forward buck switch Q3, but rather by the leakage inductance of the transformer 120.

Close examination of the switch transition reveals that the voltage initially present across the drain and source terminals of the forward buck switch Q3 is applied across the third leakage inductor L3 and limits the rate of rise of current through the switch. Consequently, the voltage across the forward buck switch Q3 collapses very quickly to near zero and stays low while the current is ramping from zero up to the load current level in the output inductor $L_{OUT}$. By definition, the forward buck switch Q3 operates in a zero voltage transition mode wherein the drain-to-source voltage becomes negligible before any significant current is flowing in the switch. Therefore, turn-on losses are almost completely eliminated in the forward buck switch Q3.

The freewheeling buck switch Q4 is employed as a synchronous rectifier in the output converter and operates in a reverse conduction mode. As is well-known by those skilled in the art, the turn-on procedure is nearly lossless for a MOSFET device in third-quadrant operation. At the beginning of its conduction period, the freewheeling buck switch Q4 remains in the OFF state, and its body diode D4 is reversed biased so that current cannot flow through the switch. As the drain-to-source voltage diminishes due to current flowing through the drain-to-source capacitance C4, the freewheeling buck switch body diode D4 eventually becomes forward biased. At that time, current starts flowing through the switch, but a nearly lossless turn-on is accomplished because there is an insignificant voltage left across the switch.

A MOSFET device in third-quadrant operation accrues losses at turn-off due to the reverse recovery of the body diode. After the forward current reaches zero in the body diode, another current spike in the reverse direction is needed to remove the stored charge from the device. This reverse recovery current spike flows at least partially through the body diode after the full turn-off voltage has already been applied thereby causing significant losses and power dissipation. This loss element is also present in the freewheeling buck switch Q4.

As mentioned above and indicated in FIG. 5, the buck output power converter employs leading edge modulation, and the effect of the secondary-side leakage inductance has to be taken into account. If traditional trailing edge modulation were used in a circuit like that of FIG. 5, switches Q1, Q1' and Q3 would turn on simultaneously at the falling edge of the CLKRST signal, and the turn-off instant of the forward buck switch Q3 would be modulated to achieve output voltage regulation. The turn-off of the forward buck switch Q3 would take place within the conduction period of switches Q1 and Q1' or switches Q2 and Q2'. The current in the secondary winding of the transformer would be interrupted by the forward buck switch Q3 without providing a path or mechanism to handle the energy stored in the secondary-side leakage inductance L3. The drain-to-source voltage of the forward buck switch Q3 would rise rapidly, potentially driving the MOSFET into avalanche mode to dissipate the energy stored in the leakage inductance. Such avalanche operation would likely result in the destruction of the device.

The use of leading edge modulation avoids this potential problem. Because the high-current carrying switches are turning off at the same time, energy stored in the leakage inductance is directed to the primary side of the transformer 120 and utilized for zero voltage transition operation of the push-pull switches Q1 and Q2 on the primary side. It is important to ensure the appropriate turn-off timing of the switches. Therefore, as shown in the circuit diagrams, the use of a synchronization signal generated by the oscillator 112 is desirable. The synchronization signal allows perfect alignment of the turn-off commands, because advanced information about upcoming changes in operation is provided to the buck converter.

Figure 5:
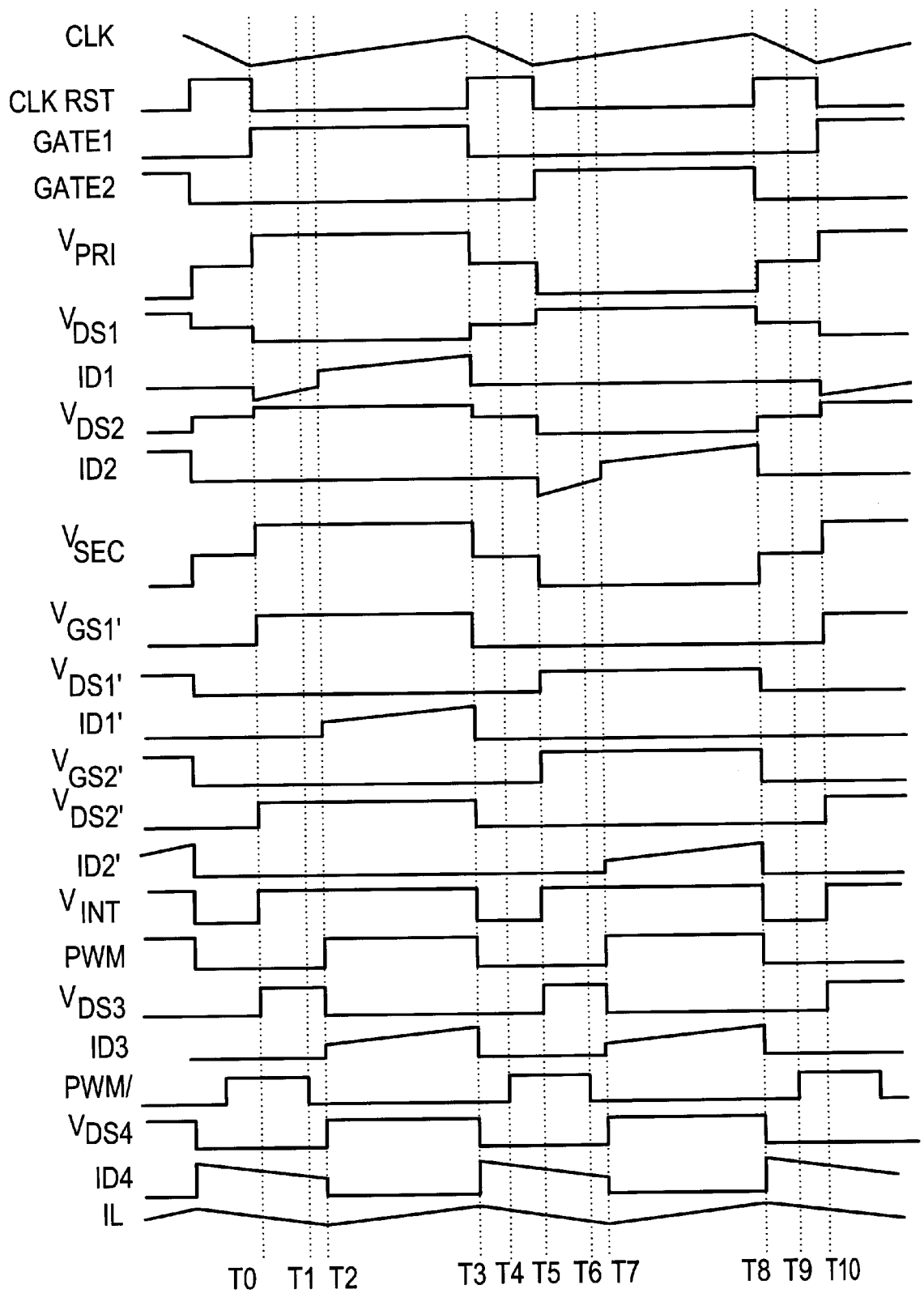
FIG. 5 is a general timing diagram of operating waveforms in the isolated power supply of FIGS. 2–4.

The operation of the circuit is explained with reference to the detailed timing diagram of FIG. 5. The signal and device names in these figures correspond to those of FIG. 3. As a convention, the dots near the various transformer windings indicate a positive potential with respect to the other, unmarked termination of the respective windings. All waveforms are referenced to the clock reset waveform, CLKRST, the period of which equals the discharge time of a timing capacitor (not shown). The beginning of a switching cycle is marked as time 't0' and coincides with the falling edge of the CLKRST signal.

Time Interval: pre-t0

Before time t0, the CLKRST signal is at a high logic level indicating that the timing capacitor is being discharged. During the discharge interval, the first and second push-pull switches Q1 and Q2 are in the OFF state. Consequently, their drain-to-source voltages $V_{DS1}$ and $V_{DS2}$ are each equal to the input voltage $V_{IN}$, and there is zero voltage across the first and second primary-side windings 122, 124. Furthermore, on the secondary side, the voltages $V_{SEC}$ and $V_{INT}$ are also zero volts, and thus the top and bottom rectifier switches Q1' and Q2' are in the OFF state. The forward buck switch Q3 is in the OFF state, while the freewheeling buck switch Q4 is in the ON state. The current through the output inductor $L_{OUT}$ decreases to signify a freewheeling period of the buck converter.

Time Interval: t0–t1

A switching cycle starts upon the falling edge of the CLKRST signal at time t0. The GATE1 control signal transitions to a high logic level to activate the first push-pull switch Q1, so that the input voltage $V_{IN}$ is applied across the associated primary-side winding 122. In accordance with the dot orientation of the first and second primary-side windings 122, 124, the drain-to-source voltage $V_{DS2}$ of the second push-pull switch Q2 is equal to twice the input voltage $V_{IN}$. Consequently, a voltage proportional to the input voltage $V_{IN}$ and inversely proportional to the turns ratio N appears across the top and bottom secondary-side windings 126, 128. Due to the polarity of the voltage forced on the top and bottom secondary-side windings 126, 128, the bottom rectifier switch Q1' is placed into the ON state as well.

Because the PWM control signal is maintaining the forward buck switch Q3 in an OFF state (and also because the top rectifier switch Q2' is in an OFF state), no current flows in the bottom secondary-side winding 126, even though bottom rectifier switch Q1' is in the ON state. The first push-pull switch Q1 and associated first primary-side winding 122 carry only the magnetizing current of the transformer, and there is no energy transferred from the primary-side to the secondary-side of the transformer 120.

The freewheeling buck switch Q4 remains in the ON state during this period to keep the buck converter in a freewheeling mode of operation. The path of the load current is through the inductor $L_{OUT}$ and the freewheeling buck switch Q4. During this time interval the inductor current is decreasing at a rate approximately equal to the ratio $V_{OUT}/L_{OUT}$, indicating that energy is being transferred from the inductor $L_{OUT}$ to the load and to the output capacitor Cout.

Time Interval: t1–t2

During this time interval there are no changes in the operation of the push-pull converter. The first push-pull switch, Q1, is still conducting so that the input voltage is applied across the associated first primary-side winding 122. The induced voltage on the top and bottom secondary-side windings 126, 128 keeps the bottom rectifier switch, Q1', in the ON state, but there is still no load current flowing in through the associated bottom secondary-side winding 126. Thus, only the magnetizing current is flowing through the first primary-side winding 122.

At time t1, the onset of which is varied by the PWM controller 150 in response to different input-to-output voltage ratios and load conditions, the PWM/ control signal is deactivated. The deactivation causes no change in the operation in the buck converter because the freewheeling buck switch Q4 operates in reverse conduction mode wherein current flows from the source terminal toward the drain terminal.

Therefore, when the PWM/ control signal transitions from a high logic level to a low logic level, the current in the freewheeling buck switch Q4 transfers from the MOSFET channel to the parasitic body diode of the MOSFET device. This current transfer has practically no effect on the operation of the rest of the power converter circuitry. The load current continues to circulate in a path that includes the load, the freewheeling buck switch Q4, and the output inductor $L_{OUT}$. The inductor current continues to decrease between time t1 and time t2 at the same rate.

The t1–t2 time interval is often called the "gap" or dead-time period between activation of the two complementary drive signals of the synchronous rectifier switches used in various power converter topologies (buck, forward, etc.). The duration of the gap period is set according to the switching characteristics and the gate drive speed of the forward buck switch Q3 and the freewheeling buck switch Q4. The gap period must be long enough to ensure that the buck and forward power switches are not conducting at the same time, but it must also be kept at a minimum to reduce the conduction period of the parasitic body diode of the bottom rectifier switch Q4.

Time Interval: t2–t3

At time t2, the PWM control signal is activated to place the forward buck switch Q3 in the ON state. Initially, the load current flows through the output inductor $L_{OUT}$, the bottom secondary-side winding 126 and the bottom rectifier switch Q1'. In order to establish the new current path, the body diode of the freewheeling buck switch Q4 has to go through reverse recovery and ultimately turn off for the rest of this time interval. A detailed description of this switching action appears above in the discussion of the soft switching characteristics of the cascaded converter arrangement.

On the primary side, the first push-pull switch Q1 continues to operate in the ON state, with the input voltage VIN applied across the associated first primary-side winding 122 and only the magnetizing current flowing. Although the state of primary-side control remains unchanged, a reflected load current starts to flow through the first primary-side winding 122 and the first push-pull switch Q1. The total primary-side current is equal to the secondary-side current flowing through the bottom secondary-side winding 126 divided by the turns ratio N:1, plus the magnetizing current already established in the primary-side circuit.

During the t2–t3 time interval, the bottom rectifier switch Q1' and the forward buck switch Q3 are placed in the ON state, and the freewheeling buck switch Q4 stops conducting. From time t2 until time t3, the current flowing through the output inductor $L_{OUT}$ increases, because energy is being transferred from the primary side to the secondary side. This energy transfer supports the load and replenishes the energy in the output inductor which was removed during the freewheeling period of the buck converter.

Time Interval: t3–t4

The CLK RST signal transitions to a high logic level at time t3. The voltage across a timing capacitor (not shown) reaches a peak value, and timing capacitor discharge is initiated by the oscillator 112. The start of the discharge process is indicated by the assertion of the CLK RST signal.

At time t3, the first push-pull switch Q1, the bottom rectifier switch Q', and the forward buck switch Q3, all of which have been conducting during the previous time interval, are placed in the OFF state by the GATE1 and PWM control signals. The bottom rectifier switch Q1' turns off automatically because the secondary-side voltage $V_{SEC}$ falls to zero.

In fact, during this time interval, neither of the push-pull switches Q1 or Q2 is conducting, and the energy transfer from the primary side to the secondary side stops. Accordingly, the rectifier switches Q1' and Q2', the forward buck switch Q3, and the freewheeling buck switch Q4 are in the OFF state as well.

The t3–t4 time interval, like the t1–t2 time interval, is a gap period, and the above description regarding the circuit setup and operation during the t1–t2 time interval also applies to the t3–t4 time interval.

Because the bottom rectifier switch Q1' and the forward buck switch Q3 are both in the OFF state, the output inductor current $I_{LOUT}$ cannot flow through the top and bottom secondary-side windings 126, 128. The only available path for the inductor current is through the body diode D4 of the freewheeling buck switch Q4. The load current is supported from energy stored in the output inductor $L_{OUT}$, and the inductor current starts decreasing during this time interval.

Time Interval: t4–t5

During this time interval the oscillator 112 is still operating in the discharge cycle as indicated by the CLKRST signal. Accordingly, the push-pull switches Q1 and Q2 remain in an OFF state with no voltage applied across the first and second primary-side windings 122, 124. As a result, the secondary-side voltage $V_{SEC}$ equals zero volts, and the rectifier switches Q1' and Q2' are in the OFF state. The current in the output inductor $L_{OUT}$ is flowing through the load and the body diode D4 of the freewheeling buck switch Q4, distinguishing the freewheeling operation of the buck converter.

The only operational change occurs at time t4 when the PWM/ control signal transitions to a high logic level and the freewheeling buck switch Q4 is placed into the ON state and operates in the previously described reverse conduction mode. The activation of the freewheeling buck switch Q4 causes no change in the operation in the buck power converter. The path of the output inductor current is already established through the parasitic body diode D4 of the freewheeling buck switch Q4, and at time t4 the current path transfers from the body diode D4 to the conducting channel of the power switch Q4. This current transfer has no effect in the operation of the rest of the circuitry.

The end of this time interval, time t5, concludes an entire clock cycle and a switching cycle for one-half of the push-pull converter. At time t5, the CLKRST signal goes low indicating that the timing capacitor has been discharged and the circuit is ready for another clock cycle and the switching cycle for the second half of the push-pull converter.

Time Interval: t5–t10

The operating procedure for the second half of the push-pull converter is described with reference to the t5–t10 time interval, which is essentially identical to the operating procedure described for the t0–t5 time intervals. In fact, the forward and freewheeling buck switches Q3 and Q4 work exactly as described above, while the second push-pull switch Q2 and the top rectifier switch Q2' operate as their corresponding counterparts Q1 and Q1' operate during the t0–t5 time intervals, utilizing the transformer windings 124 and 128 of FIG. 4.

At time t5, the GATE2 control signal transitions to a high logic level to activate the second primary-side power switch Q2, so that the input voltage $V_{IN}$ is applied across the associated second primary-side winding 124. In accordance with the dot orientation of the first and second primary-side windings 122, 124, the drain-to-source voltage $V_{DS1}$ of the first push-pull switch Q1 is equal to twice the input voltage $V_{IN}$. Consequently, a voltage proportional to the input voltage $V_{IN}$ and inversely proportional to the turns ratio N appears across the top and bottom secondary-side windings 126, 128. Due to the polarity of the voltage forced on the top and bottom secondary-side windings 126, 128, the top rectifier switch Q2' is switched into the ON state as well.

Because the PWM control signal is maintaining the forward buck switch Q3 in the OFF state, no current flows in the top secondary-side winding 128, even though the top rectifier switch Q2' is in the ON state. The second push-pull switch Q2 and the associated second primary-side winding 124 carry only the magnetizing current of the transformer 120, and there is no energy transferred from the primary-side to the secondary-side of the transformer 120. The freewheeling buck switch Q4 remains in the ON state during this period to keep the buck converter in a freewheeling mode of operation. The path of the load current is through the inductor $L_{OUT}$ and the freewheeling buck switch Q4. The inductor current is decreasing at a rate approximately equal to the ration $V_{OUT}/L_{OUT}$, indicating that energy is being transferred from the inductor $L_{OUT}$ to the load and to the output capacitor Cout.

At time t6, the PWM/ control signal is deactivated to switch the freewheeling buck switch Q4 to the OFF state and thus commence another gap period. The PWM control signal is activated at time t7 to switch the forward buck switch Q3 to the ON state and thus end the active gap period. The current flowing in the output inductor $L_{OUT}$ starts to increase due to its changing voltage polarity.

Between time t7 and time t8, the primary-side current flowing through second push-pull switch Q2 and the associated second primary-side winding 124 increases due to the load current flowing in the top secondary-side winding 128. The total primary-side current is equal to the secondary-side current flowing through the top secondary-side winding 128 divided by the turns ratio N plus the magnetizing current already established in the primary-side circuit.

At time t8, which is the beginning of the next clock reset period, the second push-pull switch Q2 and the forward buck switch Q3 are turned to the OFF state simultaneously by their respective control signals, GATE2 and PWM. The top rectifier switch Q2' is also switched to the OFF state.

At time t9, the freewheeling buck switch Q4 is switched to the ON state, while both push-pull switches Q1 and Q2 and the forward buck switch Q3 are in the OFF state. At time t10, one complete operating cycle of the cascaded converter is completed.

The transformer specification is important for proper operation of the power supply. The transformer turns ratio N determines the level of the secondary-side voltage $V_{SEC}$, which is equal to $(2 * V_{IN})/N$. The voltage $V_{SEC}$ serves as the gate drive voltage for the rectifier switches Q1' and Q2', and it should not exceed the maximum voltage rating for the switch gate terminal, typically ±20 volts. At the same time, the secondary-side voltage $V_{SEC}$ determines the level of the intermediate voltage $V_{INT}$, which can be maximized to obtain the best transient response, and the level of the primary-side current. Furthermore, the turns ratio N determines the duty-cycle cycle of the buck converter, which is equal to $(N * V_{OUT})/V_{IN}$. It may also be desirable to implement a transformer secondary with single turn foil windings, which limits the turns ratio to integer numbers. Using single-turn secondary-side windings also limits the maximum number of primary turns and thus may require a core with a larger cross-sectional area to achieve a reasonable core loss.

For larger step-down ratios, e.g., 48V to 1.5V, calculations show that the optimum turns ratio N may be limited by the maximum gate voltage rating (i.e., 20 volts) of the self-driven rectifier switches Q1' and Q2'. For this example, a turns ratio of N=8 will result in a gate voltage of 12 volts, or $(2 * 48)/8$, which is well below the maximum specified value of 20 volts. The buck converter duty cycle is approximately 25%, or $(8 * 1.5)/48$.

The timing of the forward buck switch PWM control signal relative to the primary-side control signals GATE1 and GATE2 is also important. If the forward buck switch Q3 is still conducting when both push-pull switches Q1 and Q2 are in the OFF state, the current flowing through the output inductor $L_{OUT}$ loads the resonant tank of the primary side. This can potentially cause the zero-voltage transition operation to be lost, resulting in increased turn-on losses for the push-pull switches Q1 and Q2. Accordingly, the turn-off of the forward buck switch Q3 should be accomplished with little or no delay relative to the turn-off of the push-pull switches Q1 and Q3.

If a primary-side control signal GATE1 or GATE2 is also used to synchronize the secondary-side control signal PWM, then the primary-side control signals GATE1 and GATE2 should be delayed by the propagation time of the synchronization signal PWM. The propagation time is the time it takes for the synchronization signal to cross the isolation boundary. As this solution is somewhat cumbersome, it may be preferable to use a primary-side signal that sufficiently precedes the primary-side control signals as a secondary-side synchronization signal. For example, a RAMP signal (not shown), typically generated by an oscillator, may be used an the synchronization signal.

Figure 6:
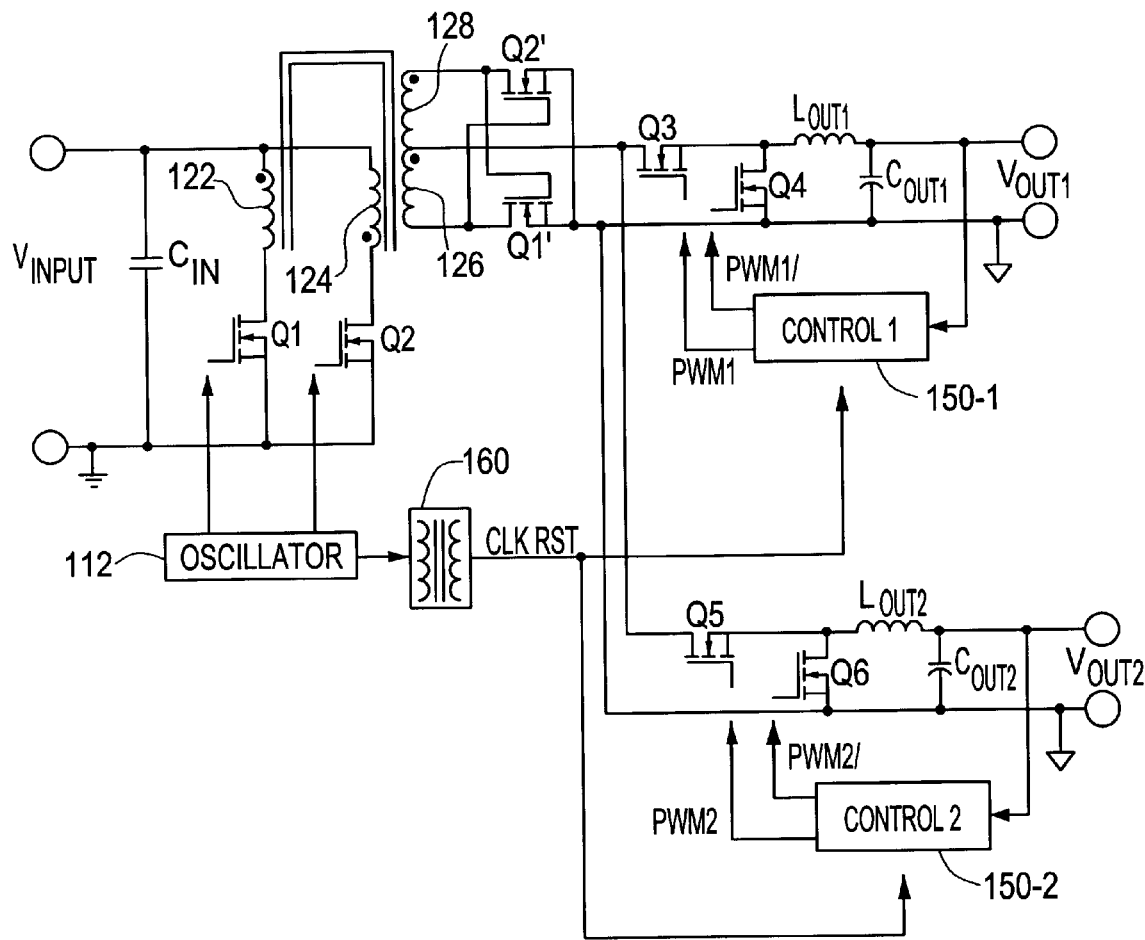
FIG. 6 is a detailed block diagram of a dual-output, isolated power supply having a cascaded architecture in accordance with the invention.
Figure 7:
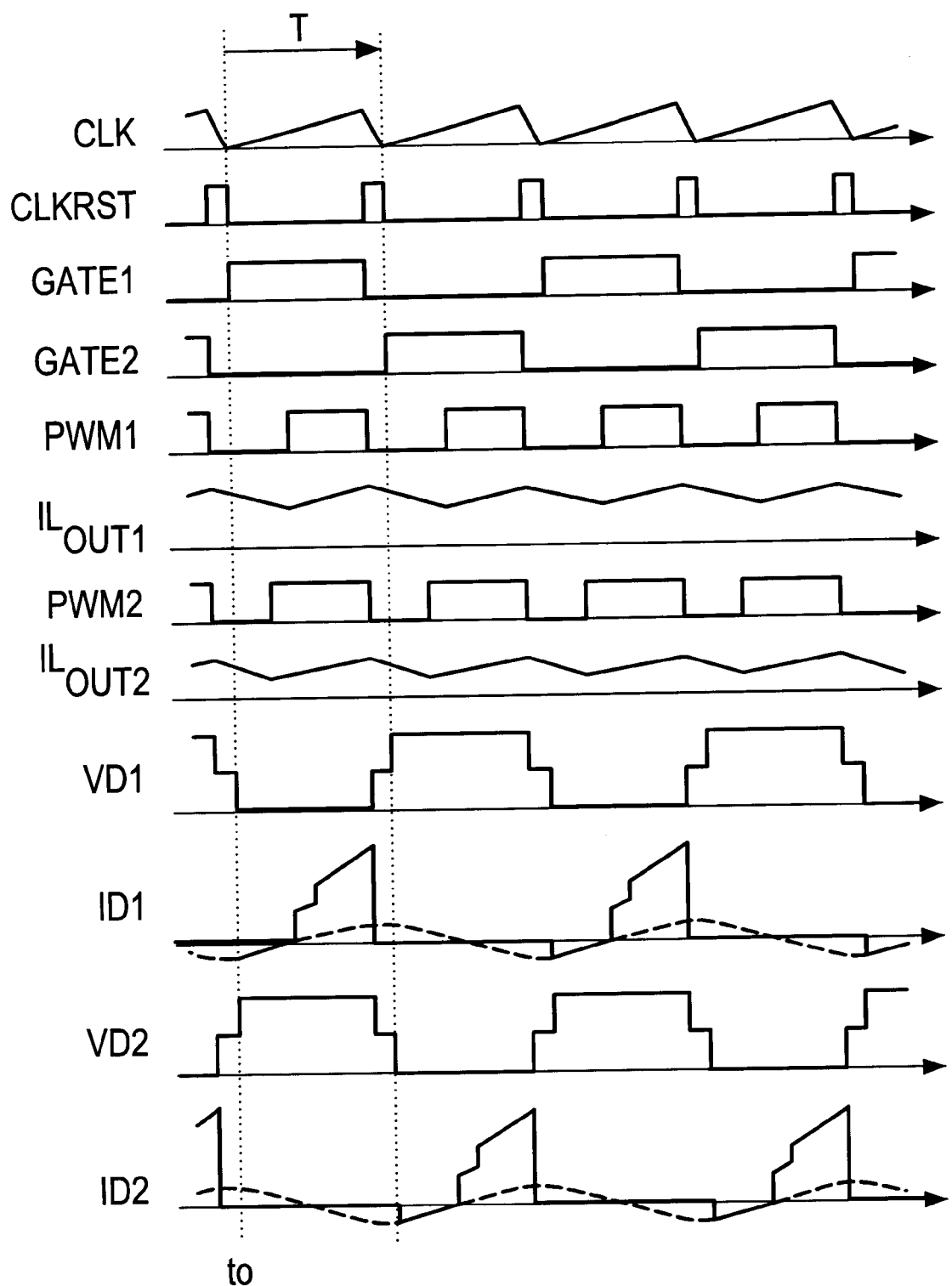
FIG. 7 is a timing diagram of operating waveforms in the isolated power supply of FIG. 6.

A dual-output version of an isolated power supply including a pair of buck converters is illustrated in Figure 6. The secondary-side windings 126, 128 and the CLKRST synchronizing signal are shared between the two buck converters. The buck converters may regulate voltages at different levels wherein they operate at different duty cycles. A theoretical timing diagram for the dual-output power supply is illustrated in FIG. 7.

A preferred embodiment of the invention having been described, it will be apparent to one of skill in the art that other embodiments incorporating its concepts may be used. Accordingly, the invention should be limited only by the spirit and scope of the appended claims.

What is claimed is:

1. A power supply comprising:
   a transformer-coupled power converter operative to convert an input direct current (DC) voltage to an intermediate DC voltage, said transformer-coupled power converter including:
      a transformer having at least one primary-side winding and at least one secondary-side winding;
      at least one pair of free-running primary-side power switches operative to generate a nearly 100% duty cycle secondary-side voltage; and
      at least one pair of secondary-side rectifiers operative to rectify a secondary-side current from said at least one secondary-side winding to produce said intermediate DC voltage;
   a buck power converter operative to produce a regulated output voltage from said intermediate DC voltage, said buck output converter including a forward buck switch in series with said at least one secondary-side winding of said transformer, and a freewheeling switch in parallel with said forward buck switch and said at least one secondary-side winding, said forward buck switch being controlled by a control signal; and
   a pulse width modulation (PWM) control circuit operative to monitor said regulated output voltage and to generate said control signal for said forward buck switch so as to maintain said regulated output voltage within a predetermined regulated range.

2. A power supply according to claim 1, wherein said transformer-coupled power converter further includes a free-running oscillator generating free-running gate signals for controlling the switching of said at least one pair of free-running primary-side power switches and a synchronization signal for synchronizing said PWM controller to said free-running gate signals.

3. A power supply according to claim 2, further comprising an isolating signal transmission element operative to feed said synchronization signal from said oscillator to said PWM controller.

4. A power supply according to claim 3, wherein said isolating signal transmission element is a signal transformer.

5. A power supply according to claim 3, wherein said isolating signal transmission element is an opto-coupler.

6. A power supply according to claim 1, wherein said freewheeling switch is a diode.

7. A power supply according to claim 1, wherein said freewheeling switch is a freewheeling transistor controlled by a control signal being complementary to said control signal for the forward buck switch, and wherein said PWM control circuit is operative to generate said control signal for said freewheeling transistor.

8. A power supply according to claim 7, wherein said PWM controller modulates leading edges of pulses composing said complementary control signals for said forward buck switch and said freewheeling transistor.

9. A power supply according to claim 1, wherein said PWM controller modulates leading edges of pulses composing said control signal for said forward buck switch.

10. A power supply according to claim 1, wherein said switches are operated using a soft-switching technique to reduce switching losses and thereby improve power supply efficiency.

11. A power supply according to claim 1, further comprising:
   a second buck power converter operative to produce a second regulated output voltage from said intermediate DC voltage in response to a second control signal; and
   a second PWM controller operative to monitor said second regulated output voltage and to generate said second control signal for a forward buck switch in said second buck converter so as to maintain said second regulated output voltage within a second predetermined regulated range.

* * * * *